United States Patent [19]

Presswalla et al.

[11] Patent Number: 4,627,203
[45] Date of Patent: Dec. 9, 1986

[54] POST-TENSIONED FLOOR WITH IN-FLOOR DISTRIBUTION SYSTEM

[75] Inventors: Hoshang H. Presswalla, Wheaton, Ill.; Yale R. Shea, Hales Corners, Wis.

[73] Assignee: INRYCO, Inc., Milwaukee, Wis.

[21] Appl. No.: 747,953

[22] Filed: Jun. 24, 1985

[51] Int. Cl.$^4$ .............................. E04B 5/48; E04C 2/52
[52] U.S. Cl. ........................................ 52/221; 52/226; 174/96
[58] Field of Search ................. 52/381, 229, 226, 220, 52/221, 126.2; 174/96, 98

[56] References Cited

FOREIGN PATENT DOCUMENTS

| | | | |
|---|---|---|---|
| 524218 | 1/1951 | Canada ................................... | 52/221 |
| 664735 | 1/1952 | United Kingdom .................. | 52/229 |
| 1026332 | 4/1966 | United Kingdom .................. | 174/98 |

OTHER PUBLICATIONS

Portland Cement Association 1972—Special Report Architectural Design Aid "Flat-Plate Electrified Floor Systems for Multistory Buildings.

Primary Examiner—James L. Ridgill, Jr.
Attorney, Agent, or Firm—Marshall, O'Toole, Gerstein, Murray & Bicknell

[57] ABSTRACT

This disclosure relates to a floor construction comprising a concrete slab which is supported adjacent its edges of the slab. A plurality of cellular raceways are embedded in the slab, and at least one intermittently bottomless trench runs across the raceways. The trench is located along a line where the bending moment on the slab is substantially zero. The construction further comprises a plurality of post-tensioned tendons which extend across the slab, underneath the trench and between the raceways.

9 Claims, 8 Drawing Figures

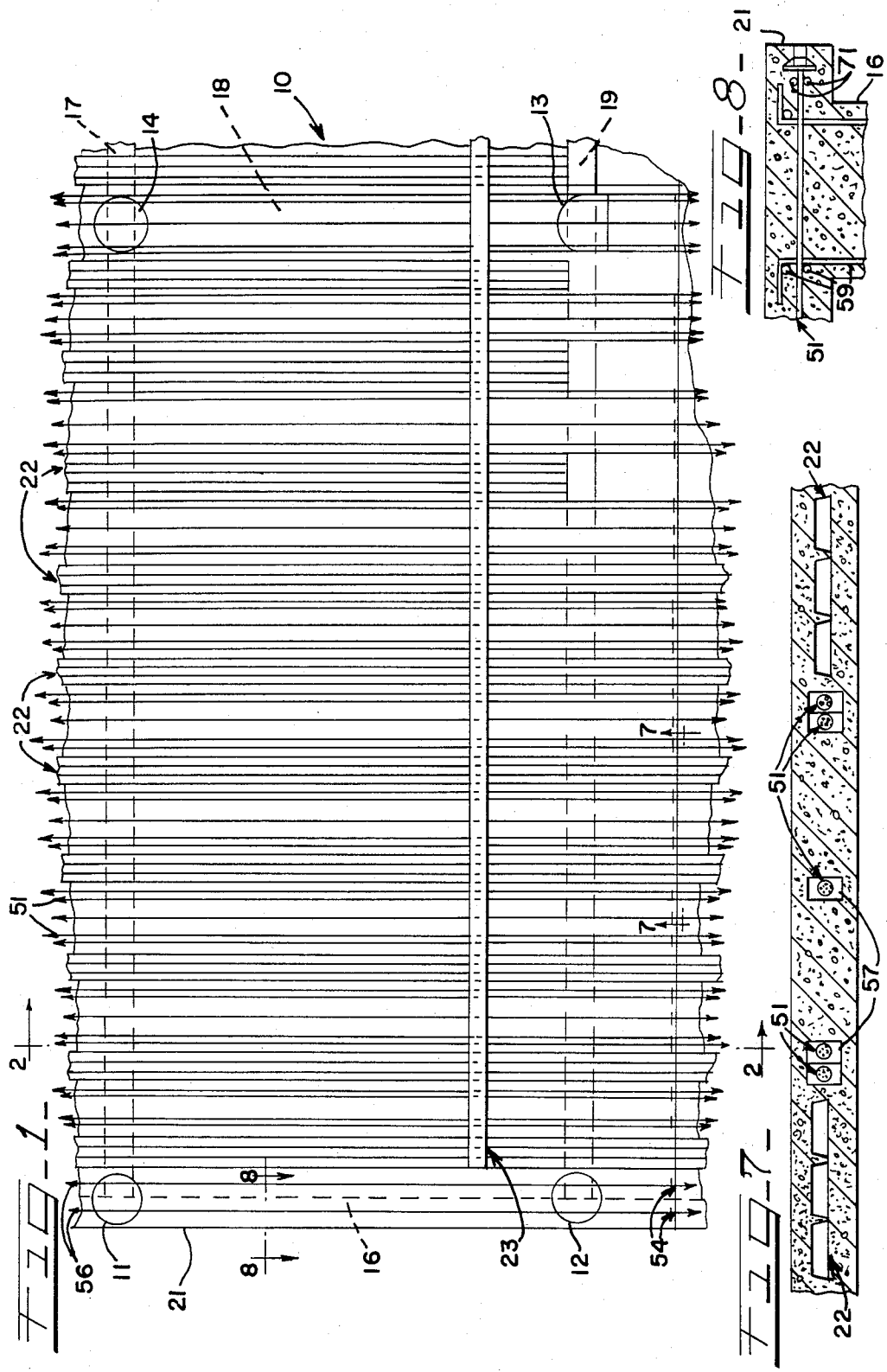

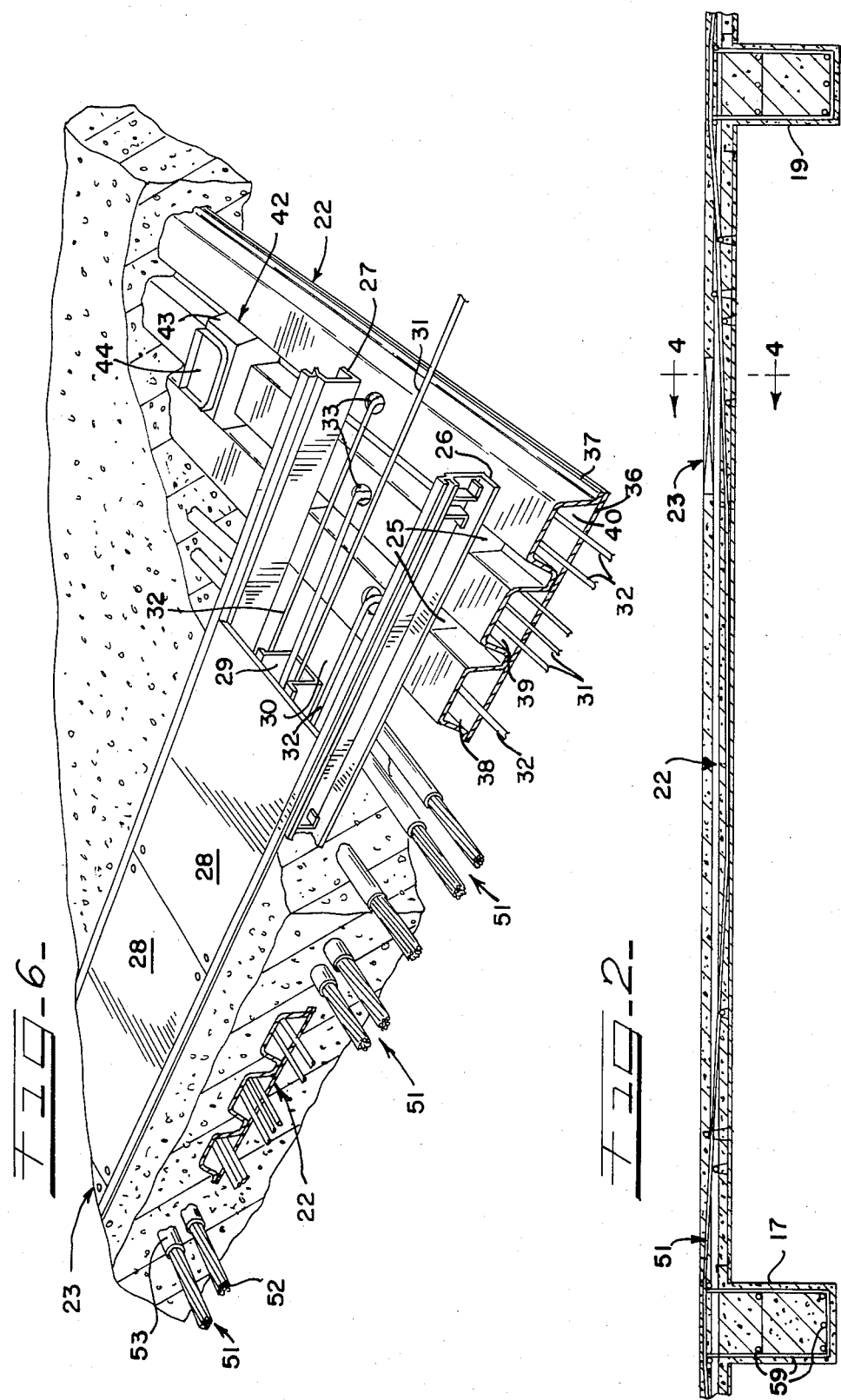

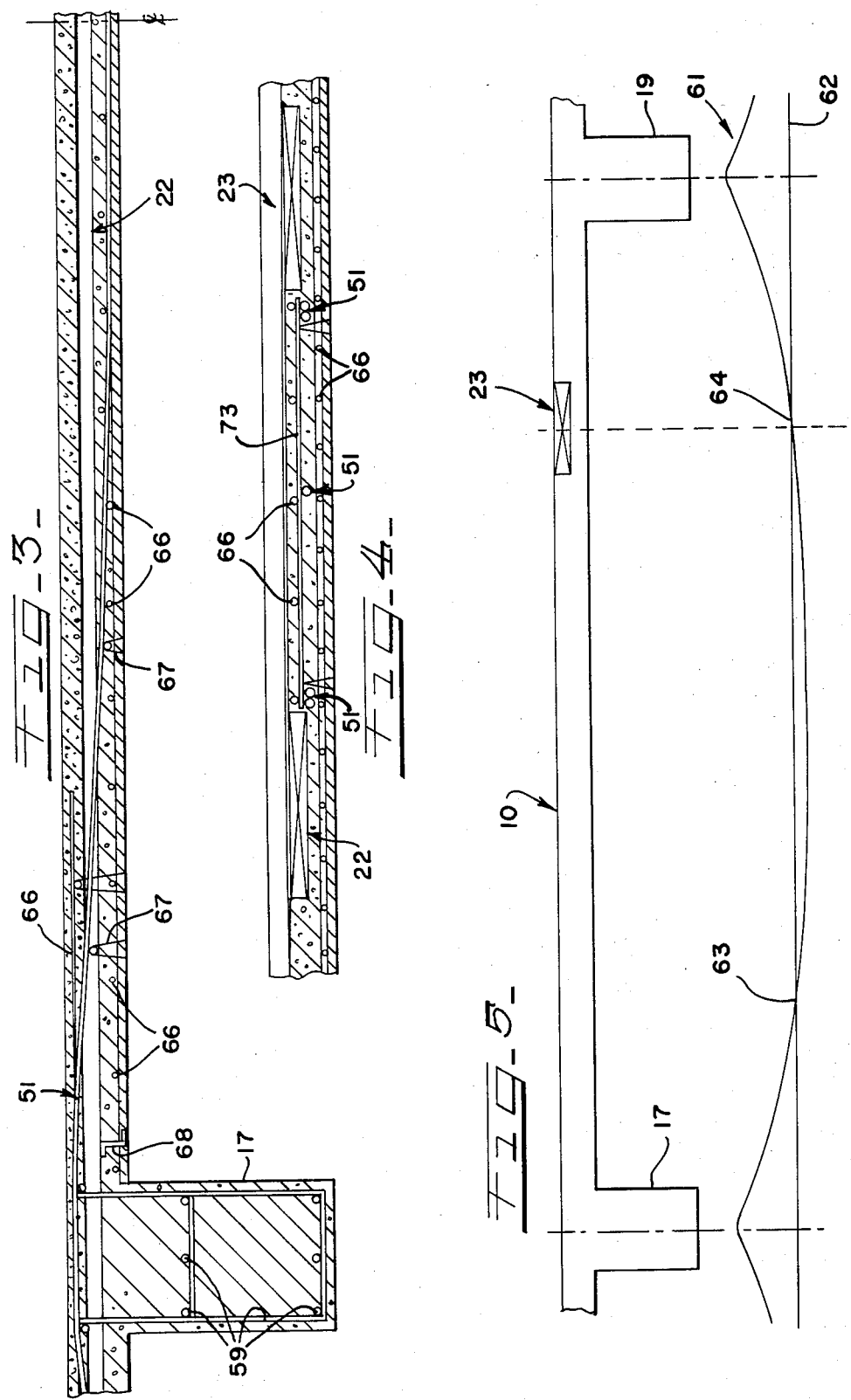

POST-TENSIONED FLOOR WITH IN-FLOOR DISTRIBUTION SYSTEM

FIELD AND BACKGROUND OF THE INVENTION

The field of this invention relates to a post-tensioned concrete floor construction including an in-floor electrical wiring distribution system.

Post-tensioned concrete slab constructions have become commonly used in recent years. When used as a floor of an office building, this construction has inherent advantages over other types of floors because the strength of the concrete slab is improved along with a reduction in the thickness of the floor. In such a floor, a series of steel tendons extend across and are embedded in the concrete slab, and after the concrete has set, the tendons are placed under high tension in order to counteract the load stresses placed on the slab during use.

It has also been commonplace to provide an in-floor electrical wiring distribution system in other types of concrete floors of office buildings. A typical system of this nature includes a service outlet or fitting at each work station on the floor, and connections for electric power, telephones and data transmission at each service outlet. A series of cellular metal floor raceways are embedded in the slab and carry the wiring to the service outlets, and a trench, partially embedded in the slab, runs crosswise of the raceways and carries the wires to the raceways.

It will be apparent that a concrete slab, or a section of a slab, containing an in-floor distribution system as described must have embedded therein a large number of service outlets and raceways and at least one trench, and these components create voids in the concrete, and the voids reduce the strength of the slab. The voids are particularly large and critical at each location where the trench intersects the raceways. The trench extends across the upper surfaces of the raceways and consequently there is a doubly thick void at the intersections.

Heretofore, concrete slab floors have not been provided with both an in-floor distribution system and with post-tensioned tendons, and it is believed that there are a number of reasons for this. The loss of strength due to the voids in the slab produced by the distribution system components would normally be considered to prohibit this combination. Further, it would be considered that the distribution system components would interfere with the layout of the tendons in the slab, and the large number of embedded components would tend to produce honeycombing in the concrete.

It is a general object of this invention to provide a combination post-tensioned concrete floor and an in-floor electrical distribution wire system.

BRIEF SUMMARY OF THE INVENTION

A construction in accordance with the present invention comprises a concrete slab and supports adjacent the edges of the slab. A plurality of cellular raceways are embedded in the slab, and at least one intermittently bottomless trench runs across the raceways. The trench is located along a line where the bending moment on the slab is substantially zero. The construction further comprises a plurality of post-tensioned tendons which extend across the slab, underneath the trench and between the raceways.

BRIEF DESCRIPTION OF THE DRAWINGS

FIG. 1 is a fragmentary plan view of a floor constructed in accordance with the present invention;

FIG. 2 is a sectional view taken on the line 2—2 of FIG. 1;

FIG. 3 is an enlargement of part of the floor shown in FIG. 2;

FIG. 4 is an enlarged fragmentary sectional view taken on the line 4—4 of FIG. 2;

FIG. 5 is a diagrammatic illustration of the bending moments on the floor;

FIG. 6 is a fragmentary perspective view of part of the floor shown in FIG. 1;

FIG. 7 is an enlarged fragmentary view taken on the line 7—7 of FIG. 1; and

FIG. 8 is an enlarged fragmentary sectional view taken on the line 8—8 of FIG. 1.

DETAILED DESCRIPTION OF THE DRAWINGS

FIG. 1 is a plan view of a section of a concrete floor in accordance with the invention. The floor includes a concrete slab indicated by the reference numeral 10 which is supported by a plurality of vertical columns 11-14 which are arranged at the corners of a rectangle in the present example. The slab 10 is further supported by beams 16-19 which extend between the columns 11-14 on the under side of the slab 10, the beams 17 and 19 being shown in FIG. 2 and being representative. As previously mentioned, the slab 10 is a section of a larger floor, and only one edge 21 of the floor is shown in FIGS. 1 and 8. It will be noted from FIG. 8 that the edge 21 is cantilevered from the beam 16. The slab 10 is generally flat on its top and bottom surfaces, and the wet concrete is poured on flat forms (not shown) which are later removed.

The floor includes an electrical distribution wire system comprising a plurality of cellular metal raceways which are essentially identical and are indicated in the drawings by the reference numeral 22. The raceways extend vertically as seen in FIG. 1 and are generally parallel to the edge 21. The raceways 22 are spaced, for example, approximately six feet apart from center to center in a typical office building.

The distibution system further includes a header or trench 23 which extends across the raceways 22 and essentially perpendicular to the edge 21. As shown in FIG. 6, for example, the header 23 extends across the upper surfaces of the raceways, and it also connects with conventional closets (not shown) which house the distribution wires. As will be described in more detail hereinafter, the trench 23 and the raceways 22 carry power and, for example, telephone wires to the work stations on the floor, and service outlets 42 (FIG. 6) are connected to the raceways and enable a party at a work station to gain access to the wires of the system.

With specific reference to FIG. 6, the trench 23 comprises a pair of parallel spaced apart sides or rails 26 and 27 which are positioned on the upper surfaces of the raceways 22. The space between the rails 26 and 27 at the upper side thereof is closed by a series of removable cover plates 28 which are fastened to the rails by screws. The trench 23 is open at the bottom side at the intersections with the raceways 22, and in between the raceways the bottom side is closed by bottom plates 30. Plugs or trough closures 25 extend downwardly from the rails 26 and 27 and into the valleys between the cells of the raceways 22. Extending longitudinally within the space between the two rails 26 and 27 is a U-shaped isolation trough 29. The isolation trough 29 normally carries the electrical power transmission lines 31, the trough 29 isolating the power lines 31 from the other transmission lines 32, such as telephone lines and computer lines, which are in the trench on opposite sides of the trough 29.

As previously mentioned, the trench 23 extends across the upper sides of the raceways 22 and at the intersections, where the trench is bottomless, holes 33 are formed in the raceways and the lines 31 and 32 are routed through the holes 33.

Each raceway 22 comprises, in the present specific example, a substantially flat bottom plate 36 (FIG. 6) and a corrugated upper plate 37 which are secured together to form three cells 38, 39 and 40. The power transmission wires or lines 31 are normally routed through the holes 31 and into the center cell 39, whereas the other transmission lines 32 are routed into the two outermost cells 38 and 40.

Each service fitting 42 may have the construction shown in U.S. Pat. No. 4,499,332, dated Feb. 12, 1985. Such an outlet includes a housing 43 that extends over the upper surface of the center cell 39 and downwardly extending portions which extend into the valleys between the three cells. At the upper side of the housing 43 of the fitting 42 is located an opening having a removable cover 44. As described in the above patent, by removing the cover 44, access can be gained through holes in the corrugated upper plate 37 to the interiors of the three cells 38, 39 and 40 and connections made to the three sets of lines. In a typical floor space for an office work area, a service outlet 42 is located at each work station or desk on the floor so that power, telephone and data transmission lines are available at each work station.

As best shown in FIG. 6, the upper surface of the trench 23 is substantially flush with the upper surface of the slab 10 and the cover 44 is normally slightly recessed from the upper surface of the slab. The slab 10 extends around the sides and bottom of the trench 23, except in the points of intersection with the raceways, and the raceways 22 are entirely embedded in the concrete as shown in FIGS. 6 and 7, for example.

The concrete slab 10 further includes the plurality of post-tensioned tendons 51, each of which comprises a steel cable 52 (FIG. 6) surrounded by a plastic sleeve or sheath 53. A cable 52 is also normally greased so that it is movable within the sleeve 53 after the concrete has set or hardened. The construction and tensioning of the tendons 51 may be of a conventional nature. With reference to FIG. 1, the tendons 51 are indicated by straight lines and each has a fixed end 54 represented by a short transverse line and a free end 56 indicated by an arrow. Prior to the pouring of the concrete, the fixed end 54 of each tendon is secured to a plate 57 (FIG. 7) and the free end 56 extends to the edge of the slab or section being poured. Following the setting of the concrete, a jack is connected to the free end 56 of each tendon 51 which pulls the tendon and places it under high tension. The free end 56 is then secured or anchored to the edge of the concrete slab thereby holding the tendon under high tension. As best shown in FIGS. 1 and 6, in the present specific example five tendons 51 are provided between each pair of raceways 22, but additional or less than this number of tendons may be provided depending upon the anticipated load to be placed on the floor.

As best shown in FIG. 6, the tendons extend underneath the trench 23.

In other constructions wherein additional strength is required, tendons may be provided which extend perpendicularly of the tendons 51, as shown in FIG. 8. In this instance, such tendons would extend generally parallel to the trench 23 and either over or below the raceways.

With reference to FIG. 5, the slab 10, the beams 17 and 19 and the trench 23 are diagrammatically illustrated. FIG. 5 also includes a curve 61 which represents the bending moment or stress on the slab relative to a zero stress line 62. In accordance with conventional stress analysis, positive values (above the line 62) represent tensile stress and values below the line (negative) represent compressive stress. The curve 61 represents the stress on the upper surface of the slab 10, and a generally inverse curve would represent the stresses on the underside of the slab 10. Such curves are well known to those skilled in this art. The stresses are due to the weight of the floor and the load placed on the floor. In the vicinity of each of the beams 17 and 19, the slab bows downwardly and there is a tensile stress on the upper surface of the slab 10. The center area of the slab bows upwardly and there is a compressive stress on the upper surface of the slab 10. At the points indicated by the reference numerals 63 and 64, the tensile stress changes to compressive stress and there is zero stress on the upper and lower surfaces of the slab 10. A feature of this invention is that the trench 23 is located substantially on one of the zero stress points 63 and 64, and consequently the voids occuring along the trench 28 at the points where it intersects the raceways have minimal effect. This location of the trench 23 relative to the beams 17 and 19 is also illustrated in FIG. 1.

It will be noted from FIG. 2 that the tendons 51 curve through different levels of the slab and generally follow the curve of the stress line 61. The tendons are close to the upper surface of the slab adjacent the beams (where the tensile stress is highest) and they are close to the bottom surface of the slab adjacent the center area (again where the tensile stress is highest). Since the tensile strength of concrete is lower than its compressive strength, this is an advantageous layout of the tendons.

In addition to the components already described, the floor also includes reinforcing bars (rebars) 66, as shown in FIGS. 3 and 4, for example. Supports 67 are used to properly locate the level of the tendons 51 and the rebars within the slab, and Z braces or supports 68 are attached between the undersides of the raceways and the forms in order to prevent the raceways and the trench from floating when the concrete is poured. Rebars and tendons 59 (FIGS. 3 and 8) are preferably also provided within the beams 16–18 in a conventional manner. Adjacent the edges of the slab, supports 71 (FIG. 8) are provided on the upper and lower sides of the tendons 51 in order to hold the tendons in place during the pouring of the concrete. With reference to FIGS. 3 and 4, there are rebars 72 and 73 at locations where they do not interfere with the trench and the raceways. In FIG. 3, the rebars 72 stand closely adjacent the upper surface of the slab and adjacent the beams to counteract the tensile stress on the upper surface of the slab in the area of the beam, as shown in FIG. 5, and in FIG. 4, the rebars 73 are located underneath the trench 23 and between the raceways 22. The foregoing arrangement of the tendons and the reinforcing bars around the trench and the raceways also strengthens the slab without, at the same time, producing honeycombing of the slab as a result of an excessive number of parts in the areas where the raceways intersect the trench.

It will be apparent from the foregoing that a novel and useful floor construction has been provided. The floor provides the advantages both of a post-tensioned floor and of an in-floor distribution wire system. The layout or locations of the distribution system parts within the concrete slab results in minimal weakening of the slab and reduced chances of honeycombing of the concrete.

What is claimed is:

1. A floor structure comprising a poured-in-place slab of concrete, a plurality of cellular raceways extending generally parallel to each other and embedded in said concrete, a trench extending across the upper surfaces of said raceways and having points of intersection with said raceways, the upper side of said trench being substantially level with the upper surface of said concrete and the underside of said trench being embedded in said concrete and engaging the upper sides of said raceways, a plurality of preset service outlets embedded in said concrete and extending from said raceways to substantially the upper surface of said concrete, and a plurality of post-tensioned tendons embedded in said concrete and extending underneath said trench, and said trench extending substantially along a line of substantially zero bending moment of said concrete slab.

2. A floor structure according to claim 1, and further including support beams attached to said slab and extending generally parallel to said trench, said line being between and spaced from a pair of said beams.

3. A floor structure according to claim 1, wherein said trench comprises spaced parallel side rails, a removable cover plate extending across the upper sides of said rails, and bottom plates extending across the bottom sides of said rails and between said raceways.

4. A floor structure according to claim 1, and further including support means along two opposed sides of said slab, said tendons curving downwardly in the direction from said supports toward the center area of said slab.

5. A floor structure according to claim 4, wherein said tendons are adjacent said upper surface of said concrete adjacent said support means and are adjacent the lower surface of said concrete adjacent said center area of said slab.

6. A floor structure comprising a poured-in-place slab of concrete, a plurality of cellular raceways extending generally parallel to each other and embedded in said concrete, a plurality of preset service outlets embedded in said concrete and extending from said raceways to substantially the upper surface of said concrete, a trench extending across the upper surfaces of said raceways and having points of intersection with said raceways, the upper side of said trench being substantially level with the upper surface of said concrete and the underside of said trench being embedded in said concrete and engaging the upper sides of said raceways, a plurality of removable cover plates forming said upper side of said trench, and in the spaces between adjacent raceways the bottom side of said trench being formed by bottom plates, said bottom side of said trench being open adjacent each of said raceways.

7. A floor structure according to claim 6, wherein said trench extends substantially along a line of substantially zero bending moment of said slab.

8. A floor structure according to claim 6, and further including a plurality of tendons extending generally parallel with said raceways and underneath said trench.

9. A floor structure according to claim 8, and further including a plurality of reinforcing bars extending between said raceways and additional bars underneath said raceways.

* * * * *